US007689648B2

(12) United States Patent
Lev

(10) Patent No.: US 7,689,648 B2
(45) Date of Patent: Mar. 30, 2010

(54) DYNAMIC PEER NETWORK EXTENSION BRIDGE

(75) Inventor: Boaz Lev, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 295 days.

(21) Appl. No.: 11/769,493

(22) Filed: Jun. 27, 2007

(65) Prior Publication Data

US 2009/0006563 A1   Jan. 1, 2009

(51) Int. Cl.
  *G06F 15/16* (2006.01)
(52) U.S. Cl. .................. 709/203; 709/206; 709/242; 709/241; 709/239; 455/435.1; 370/256; 370/390
(58) Field of Classification Search .............. 709/201, 709/203
  See application file for complete search history.

(56) References Cited

U.S. PATENT DOCUMENTS

| | | | | |
|---|---|---|---|---|
| 6,115,753 | A * | 9/2000 | Joens | ................ 709/242 |
| 6,594,775 | B1 | 7/2003 | Fair | |
| 7,206,841 | B2 * | 4/2007 | Traversat et al. | ............ 709/225 |
| 2004/0148411 | A1 | 7/2004 | Blawat et al. | |
| 2005/0078679 | A1 | 4/2005 | Henry et al. | |
| 2005/0262232 | A1 | 11/2005 | Cuervo et al. | |
| 2005/0289339 | A1 | 12/2005 | Walker | |
| 2008/0305791 | A1 * | 12/2008 | Hiben et al. | ............. 455/435.1 |

FOREIGN PATENT DOCUMENTS

| | | |
|---|---|---|
| EP | 0868104 A2 | 9/1998 |
| WO | 9607257 A2 | 3/1996 |

OTHER PUBLICATIONS

Yannuzzi et al.; A Combined Intra-Domain and Inter-Domain QoS Routing Model for Optical Networks; http://personal.ac.upc.deu/yannuzzi/papers/2005/ondm05.pdf; 7 pages (Dec. 13, 2004).
Amir et al.; An Inter-domain Routing Protocol for Multi-homed Wireless Mesh Networks; http://www.cs.jhu.edu/~ralucam/papers/smesh_hybrid.pdf; 9 pages (admitted prior art as of the filing date).
McMaster University website: http://www.mcmaster.ca/uts/network/internet.htm; Off-Campus Traffic Paths; 3 pages (printed May 1, 2007).

* cited by examiner

*Primary Examiner*—Quang N. Nguyen
*Assistant Examiner*—Andrew Woo
(74) *Attorney, Agent, or Firm*—Merchant & Gould P.C.

(57) ABSTRACT

A dynamically extended peer network is formed from a first peer network and a second peer network. The first and second peer networks are separated from each other by a boundary. A first computing system in the first peer network is configured to establish a communication link with a second computing system in the second peer network. The first computing system relays messages from the first peer network to the second computing system. The second computing system receives the messages and posts them to the second peer network. If desired, the second computing system can send a response to the message.

8 Claims, 12 Drawing Sheets

DYNAMIC PEER NETWORK EXTENSION BRIDGE

BACKGROUND

Peer networking involves the passing of messages between computing systems that operate as "peers." When a message is posted to a peer network, the message is propagated through the peer network by the peers. Computers operating as peers within the peer network are sometimes referred to as "nodes." In a typical peer networking configuration, at least some of the nodes operate as both a client and a server. For example, a node acts as a client when it receives a message from another node. That same node also acts as a server when it passes that message to another node. In this way, messages are communicated within the peer network.

Peer networks are sometimes constrained from communication outside of a particular group, location, company, or domain. This restriction operates as a boundary to peer network communication, such that a message posted on the peer network will not be delivered to a node separated from the peer network by the boundary. Moreover, if two peer networks are separated by a boundary, a message sent on one peer network is not delivered to the other network.

SUMMARY

Embodiments of the present disclosure generally relate to an extended peer network. In one non-limiting example, a communication link is established between a first peer network and a second peer network, which are separated by a boundary. The communication link enables a message posted on the first peer network to be communicated to the second peer network.

As discussed herein, an aspect of some embodiments relates to a method of communicating between a first peer network including a first computing system and a second peer network having a second computing system. The first peer network and the second peer network are separated by a boundary. The method includes communicating with the second computing system to establish the communication link between the first computing system of the first peer network and the second computing system of the second peer network, the link capable of communicating through the boundary; receiving a first message from the first peer network with the first computing system, the first message including a first request to perform an operation; and sending a second message including the first request to perform an operation to the second computing system at the second peer network to deliver the first request to perform an operation to the second peer network.

Another aspect of some embodiments relates to a computer readable medium containing computer executable instructions which when executed by a computer perform a method of communicating between a first peer network and a second peer network separated by a boundary. The method includes communicating with the first computing system to establish the communication link between the first computing system of the first peer network and the second computing system of the second peer network, the link capable of communicating through the boundary; receiving a first message from the first computing system in the first peer network, the first message including a request to perform an operation; and posting a second message to the second peer network, the second message including the request to perform the operation from the first message.

Further aspects relate to a system for communicating messages from a first peer network to a second peer network across a communication link. The second peer network includes a second computing system. The first peer network and the second peer network are separated by a boundary. The system includes a communication system, memory, and a processor. The communication system is configured to receive messages from the first peer network and to send messages across a communication link to the second computing system. The memory stores program instructions. The processor is in data communication with the communication system and the memory. The processor is configured to execute the program instructions to cause the system to communicate with the second computing system to establish the communication link between the first computing system of the first peer network and the second computing system of the second peer network, the link capable of communicating through the boundary; receive a first message from the first peer network with the first computing system, the first message including a first request to perform an operation; and send a second message including the first request to perform an operation to the second computing system at the second peer network to deliver the first request to perform an operation to the second peer network.

This summary is provided to introduce a selection of concepts in a simplified form that are further described below in the Detailed Description. This Summary is not intended to identify key or essential features of the claimed subject matter, nor is it intended to be used in any way as to limit the scope of the claimed subject matter.

DETAILED DESCRIPTION

Figure 1:
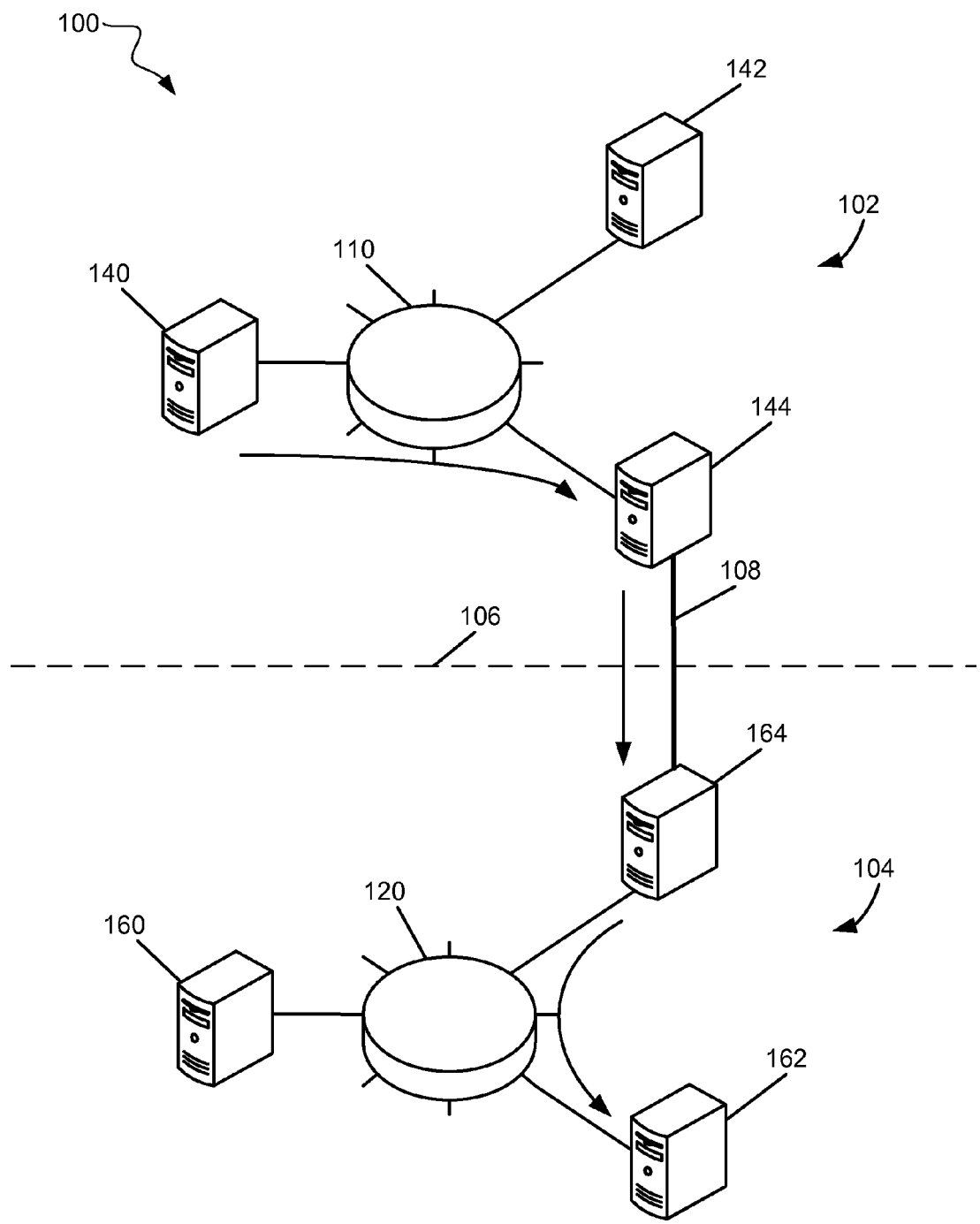
FIG. 1 is a block diagram of an example dynamically extended peer network.

This disclosure will now more fully describe exemplary embodiments with reference to the accompanying drawings, in which specific embodiments are shown. Other aspects may, however, be embodied in many different forms and the inclusion of specific embodiments in the disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements shown throughout are indicated with like reference numerals.

Embodiments of the present disclosure generally relate to a dynamically extended peer network. In one non-limiting example, a communication link is established between a first peer network and a second peer network, which are separated by a boundary. The communication link enables a message posted on the first peer network to be communicated to the second peer network.

FIG. 1 is a block diagram of an example dynamically extended peer network 100. In the illustrated example, extended peer network 100 includes domain 102, domain 104, boundary 106, and communication link 108. Domain 102 includes peer network 110. Domain 104 includes peer network 120. Peer networks 110 and 120 are separated by boundary 106. Communication link 108 crosses boundary 106 to enable communication between domains 102 and 104 and also between peer networks 110 and 120.

In the illustrated embodiment, domains 102 and 104 are separated from each other by boundary 106. Domains 102 and 104 are not required in all embodiments, but rather are illustrated as just one example of a situation in which boundary 106 exists. Domains 102 and 104 are each, for example, a group of computing systems that share common portions of their Internet Protocol (IP) addresses with the other computing systems within their respective domains, and may also be commonly administered in their respective domains.

Computing systems 140 and 142 within domain 102 are prevented from direct communication with computing systems 160 and 162 by boundary 106. One example of boundary 106 is a firewall, such as a firewall operating to restrict communications with computing systems 140 and 142 outside of domain 102. Despite the fact that the firewall restricts some communications, the firewall is beneficial for protecting computing systems 140 and 142, such as from external security threats. In one embodiment, boundary 106 is a firewall that acts to prevent communication across some or all communication ports, such as defined in the transmission control protocol (TCP) or in the user datagram protocol (UDP). In other embodiments, boundary 106 is a domain boundary, company boundary, physical boundary (such as a lack of communication wires or optical fibers, other than communication link 108), a software boundary (such as network security software), or any other type of communication barrier between computing systems.

In some embodiments, boundary 106 includes more than one boundary. For example, domain 102 can be protected by a firewall and domain 104 can also be protected by a firewall. In this example, two firewalls operate as two boundaries preventing communication between computing systems 140 and 142 of domain 102 and computing systems 160 and 162 of domain 104.

In the illustrated embodiment, peer networks 110 and 120 operate within domains 102 and 104, respectively. Peer network 110 includes a plurality of members, including computing system 140, computing system 142, and relay computing system 144. Peer network 120 includes a plurality of members, including computing system 160, computing system 162, and relay computing system 164.

Peer networks 110 and 120 each operate to communicate information between their respective members. In one embodiment, peer networks 110 and 120 are made up solely of the member computing systems, and do not require a server to control communication within the peer networks. In other embodiments, peer networks 110 and 120 include a server or other computing system that operates to assist in one or more aspects of peer networks 110 and 120, such as in configuring communication between members of the respective peer network, controlling communication between members of the respective peer network, setting up the respective peer network, or other aspects of the peer networks.

In some embodiments, communication within peer networks 110 and 120 conforms to a network communication protocol. One example of a network communication protocol is the user datagram protocol (UDP). Another example of a network communication protocol is the transmission control protocol (TCP). In some embodiments, peer networks 110 and 120 operate to communicate messages throughout the respective peer networks.

Peer networks 110 and 120 are communicatively separated by boundary 106. As a result, if it were not for communication link 108, a message posted on peer network 110 would not be able to be communicated to peer network 120. Similarly, a message posted on peer network 120 would not be able to be communicated to peer network 110.

Communication link 108 can be established between relay computing system 144 and relay computing system 164 to enable peer networks 110 and 120 to pass messages across boundary 106. Communication link 108 is established across a communication path, such as the Internet, a network, a local area network (LAN), a wide area network (WAN), wireless area network, a plain old telephone service (POTS), a radio frequency (RF) communication system, or other known communication paths. Communication across communication link 108 conforms to a communication protocol. Example communication protocols include TCP/IP, hypertext transfer protocol (HTTP), secure hypertext transfer protocol (HTTPS), or other network or data transfer protocols.

Any number of computing systems 140, 142, 160, and 162 can be included in peer networks 110 and 120 respectively. Furthermore, computing systems 140, 142, 160, and 162 can be servers having one or more clients, where the computing systems operate as servers to communicate messages between the one or more clients and the respective peer network.

Figure 2:
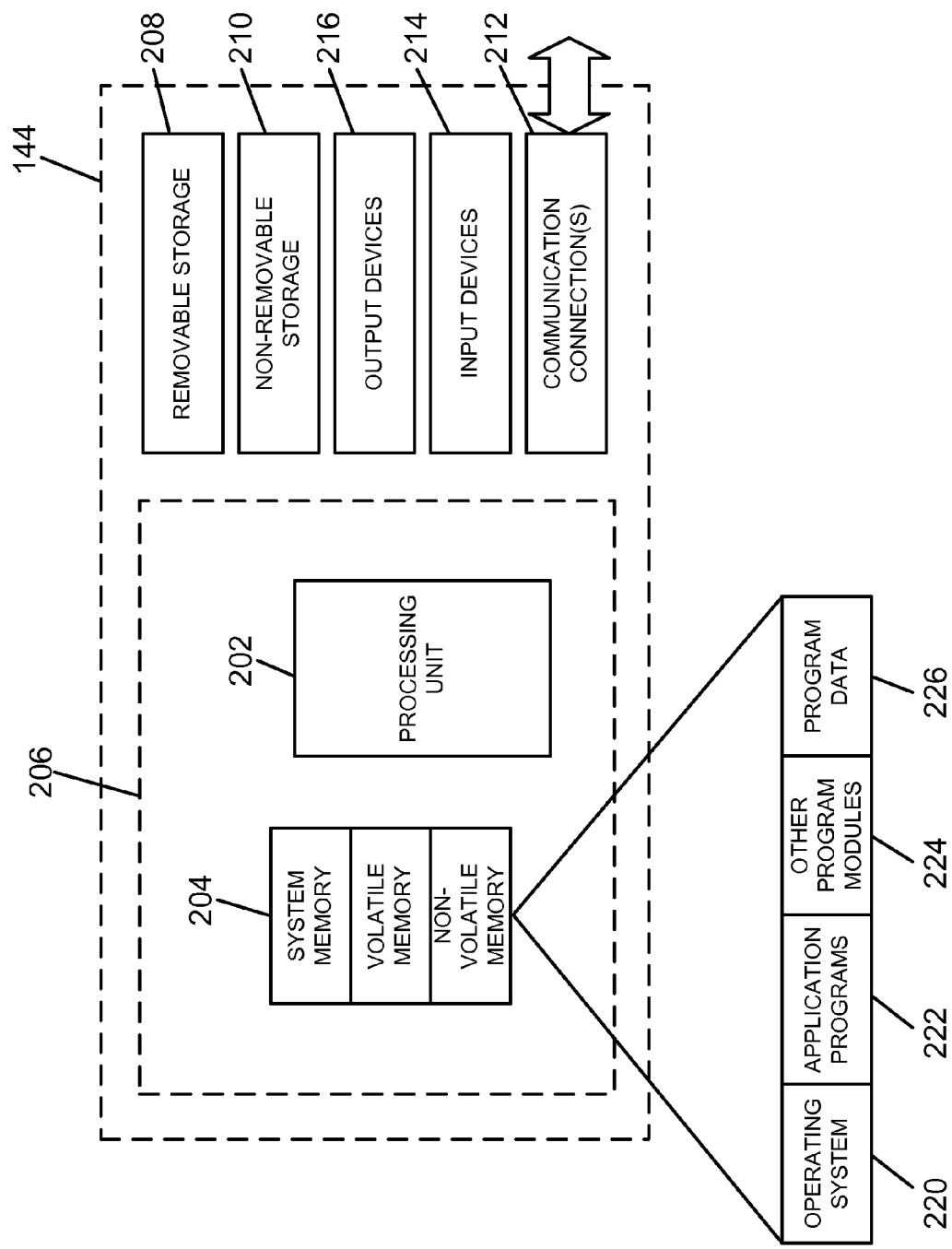
FIG. 2 is an example computing system for implementing a relay computing system of the dynamically extended peer network shown in FIG. 1.

Relay computing systems 144 and 164 communicate with each other across communication link 108. One example of relay computing systems 144 and 164 is shown in FIG. 2. Relay computing system 144 is a member of peer network 110, and as result is capable of sending and receiving messages across peer network 110. Relay computing system 144 operates to send messages received from peer network 110 to relay computing system 164. In some embodiments, relay computing system 144 also operates to post messages received from relay computing system 164 on to peer network 110.

Relay computing system 164 is a member of peer network 120, and as a result is capable of sending and receiving messages across peer network 120. Relay computing system 164 operates to send messages received from peer network 120 to relay computing system 144. In some embodiments, relay computing system 164 also operates to post messages received from relay computing system 144 on to peer network 120.

In one embodiment, extended peer network 100 operates such that a message posted to peer network 110 is distributed not only to the members of peer network 110, but also to the members of peer network 120. As a result, an "extended" or "super" peer network is formed including both peer network 110 and peer network 120.

One benefit of some embodiments of extended peer network 100 is that a resource provided by one peer network can be utilized by a computing system which is a member of the other peer network. For example, computing system 162 can be programmed to provide a service to peer network 120 involving a resource stored on or managed by computing system 162. Computing system 162 therefore monitors peer network 120 for messages requesting that an operation be performed relating to the resource. When computing system 162 receives such a message from peer network 120 it performs the operation requested in the message. Another benefit of some embodiments is that a computing system need not know a specific address of another computing system that can perform the desired operation. Instead, in some embodiments the computing system posts a message to the peer network without identifying the intended recipient. The message is communicated to all members of the peer network who read the message and determine whether or not they are capable of performing the desired operation. In some embodiments, when the computing system receives the message, it performs the operation. In other embodiments, a protocol or configuration setting is first consulted by the computing system to determine whether or not to perform the operation.

Extended peer network 100 expands upon this capability by also allowing computing systems 140 and 142 of peer network 110 to utilize the services and resources available on peer network 120. For example, computing system 140 can operate to request that computing system 162 perform an operation relating to a resource located on or managed by computing system 162. To do so, computing system 140 posts a message to peer network 110. Peer network 110 posts or broadcasts the message to the other members of peer network 110. As a result, relay computing system 144 receives the message. Relay computing system 144 then sends the message across communication link 108 to relay computing system 164. In doing so, the message is successfully passed across boundary 106. Once received by relay computing system 164, the message is posted on to peer network 120 where it is broadcast to the other members of peer network 120. The message is then received by computing system 162, which reads the message and performs the operation requested in the message.

In this way, extended peer network 100 enables communication to occur between peer network 110 and peer network 120 despite the presence of boundary 106. Moreover, the capabilities of computing systems in peer network 110 are expanded to include the capabilities of computing systems in peer network 120. Similarly, the capabilities of computing systems in peer network 120 are expanded to include the capabilities of computing systems in peer network 110.

In some embodiments, peer networks 110 and 120 are dynamically extended by relay computing systems 144 and 164 which operate to implement a bridge between the peer networks across communication link 108. In one embodiment, relay computing systems 144 and 164 dynamically extend the peer networks by automatically conforming to the communication contracts of the respective peer networks. Contracts can be defined, for example, according to the Web Services Description Language ("WSDL"). For example, when relay computing system 144 begins to provide the service, it identifies the contract being used for communication on peer network 110. Relay computing system 144 then conforms all subsequent communication with peer network 110 to that contract. Similarly, relay computing system 164 does the same with respect to peer network 120. In this way, relay computing systems 144 and 164 appear to the respective peer networks to be regular peer nodes on the network. One of the benefits of this embodiment is that a dynamic peer network extension bridge is formed that enables communication between peer network 110 and peer network 120 regardless of whether or not the peer networks are using the same contract for communication. Furthermore, as members of the peer network, neither of relay computing systems 144 and 164 are required to have any knowledge of the structure or shape of peer networks 110 or 120.

In another possible embodiment, relay computing systems 144 and 164 are a single computing system, such that communication link 108 is not required. In this embodiment, for example, the computing system is a member of both peer networks 110 and 120. Rather than communicating across communication link 108, communication from one peer network to the other peer network occurs within the single relay computing system using, for example, a loop-back device or an inter process call (IPC).

FIG. 2 is an exemplary computing system for implementing relay computing system 144 and other aspects of the present disclosure. Although the computing system is illustrated and described with reference to FIG. 2 as being relay computing system 144, the computing system can also be used to implement other computing systems, including computing system 140, computing system 142, computing system 160, computing system 162, and relay computing system 164. In its most basic configuration, computing system 144 typically includes at least one processing unit 202 and memory 204. Depending on the exact configuration and type of computing system, memory 204 may be volatile (such as RAM), non-volatile (such as ROM, flash memory, etc.) or some combination of the two. This most basic configuration is illustrated in FIG. 2 by dashed line 206. Additionally, computing system 144 may also have additional features/functionality. For example, computing system 144 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing system 144. Any such computer storage media may be part of computing system 144.

Computing system 144 may also contain communications connection(s) 212 that allow the computing system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Computing system 144 may also have input device(s) 214 such as keyboard, mouse, pen, voice input device, touch input device, etc. Output device(s) 216 such as a display, speakers, printer, etc. may also be included. All these devices are well known in the art and need not be discussed at length here.

In some embodiments, memory 204 includes one or more of operating system 220, application programs 222, other program modules 224, and program data 226. In some embodiments, global data, client-specific data, and transformation rules may each be stored in memory 204, removable storage 208, non-removable storage 210, or any other computer storage media described herein.

Figure 3:
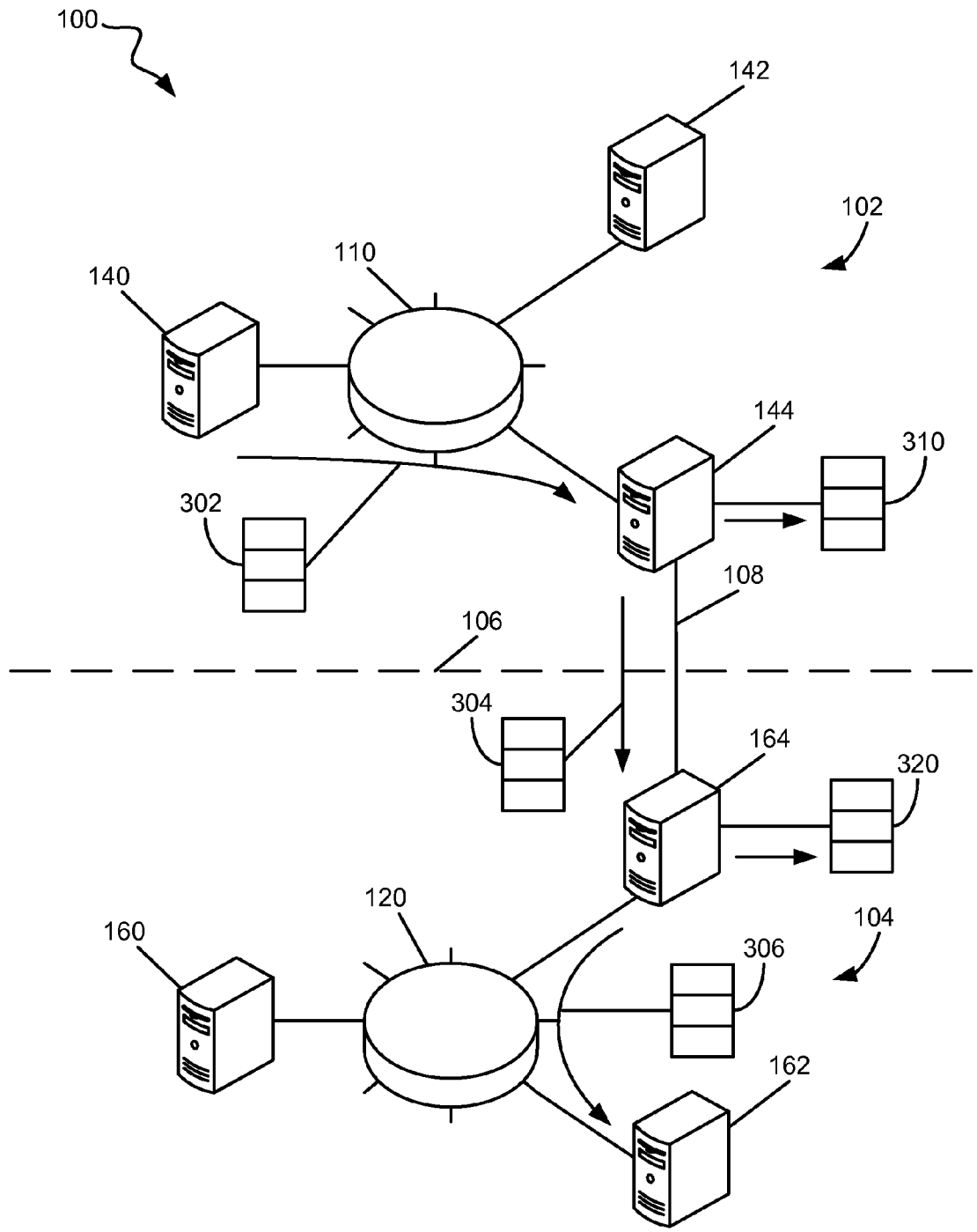
FIG. 3 is a block diagram of an embodiment of the dynamically extended peer network shown in FIG. 1.

FIG. 3 is a block diagram of an embodiment of extended peer network 100. In the illustrated embodiment, computing system 140 posts a message on peer network 110. The message is delivered through extended peer network 100 to computing system 162. The illustrated embodiment is similar to the example shown in FIG. 1, but further illustrates an embodiment in which messages 302, 304, and 306 are distributed through extended peer network 100. In addition, in the illustrated embodiment memory structures 310 and 320 are stored within extended peer network 100.

In some possible embodiments, messages 302, 304, and 306 are digital data communicated from one computing system to another computing system. In one embodiment, messages 302, 304, and 306 are text-based messages, such as formed of American Standard Code for Information Interchange (ASCII) characters, Unicode Transformation Format (UTF) characters, or other text based characters. In another embodiment, messages 302, 304, and 306 include markup language, such as hypertext transfer protocol (HTML) or extensible markup language (XML). In other embodiments, messages 302, 304, and 306 are binary messages. In yet other embodiments, messages 302, 304, and 306 are compressed and/or encrypted during transmission. Messages 302, 304, and 306 do not have to be of the same form. For example, messages 302 and 306 might be in XML format, while message 304 is an encrypted binary format. In some embodiments, messages 302 and 306 include a header and a message body. In other embodiments, messages 302 and 306 include only a message body. Various information can be contained within messages 302, 304, and 306. One example of message 302 is illustrated and described with reference to FIG. 4.

In some embodiments, extended peer network 100 enables a message posted to peer network 110 to be automatically delivered and posted to peer network 120, thereby connecting peer networks 110 and 120 such that they function as a single extended peer network 100. The process begins with message 302 being posted to peer network 110 by computing system 140.

In one embodiment, posting message 302 involves sending message 302 across a network to one or more other computing systems that are members of peer network 110. The members of peer network 110 are configured to distribute message 302 to one or more other members of peer network 110. The process continues until all members of peer network 110 have received message 302. This type of message distribution across peer network 110 is sometimes referred to as broadcasting message 302, because the message is widely distributed to the members of peer network 110. Other processes can also be used to distribute message 302 to the members of peer network 110.

In some embodiments, peer network 110 performs filtering, such that not all members of peer network 110 will receive message 302. Filtering may occur, for example, to limit the scope of message distribution within peer network 110 to a select group of members. Filtering can be performed, for example, according to one or more rules. In one example, the rules are predicates that determine the propagation of messages. Other types of rules can also be used, such as Boolean expressions or other types of rules. In other embodiments, message 302 is delivered to all members of peer network 110.

In one embodiment, computing system 140 begins by determining what type of message is to be broadcast, and then generating that message. In some embodiments, selection of the message type determines how members of the peer network will handle the message. For example, some message types will require a response to the message, while other message types are informational only. For example, if message 302 is requesting information about a resource, computing system 140 is going to desire a response to message 302, and will therefore select an appropriate message type. On the other hand, if message 302 is an informational announcement, such as informing the members of extended peer network 100 that a particular computing system is going to be restarted, computing system 140 may not desire a response to message 302, and will therefore select a different message type. If a response is needed, the message type will require that computing system 140 includes a sender identifier (e.g., sender ID 406, shown in FIG. 4) in message 302. The sender identifier enables the members of peer network 110 to know the identity of computing system 140 where message 302 originated. In this way, the sender identifier functions as a return address for message 302.

After message 302 has been posted to peer network 110 by computing system 140, the message is delivered to relay computing system 144 because it is a member of peer network 110. In one embodiment, relay computing system 144 reads message 302 and determines whether or not a response is desired to message 302. For example, relay computing system 144 determines whether message 302 includes a sender identifier (e.g. sender ID 406, shown in FIG. 4). If so, relay computing system 144 knows that a response is desired to message 302. If not, relay computing system 144 knows that a response is not desired.

If relay computing system 144 determines that a response is desired, at least part of message 302 is stored in memory structure 310. One example of memory structure 310 is illustrated and described with reference to FIG. 5. For example, the sender identifier is stored in memory structure 310. In another example, a message identifier is also stored in memory structure 310 and associated with the sender identifier. In this way, when a response is received to message 302, relay computing system 144 can query memory structure 310 for the sender identifier associated with message 302, to enable relay computing system 144 to direct the response to computing system 140.

Once message 302 has been received by relay computing system 144, relay computing system 144 prepares to communicate at least part of the information from message 302 to relay computing system 164. To do so, relay computing system 144 establishes communication link 108 with relay computing system 164. Relay computing system 144 then generates message 304 based upon message 302. In some embodiments, relay computing system 144 replaces the sender identifier of message 302 (identifying the originating computing system, such as computing system 140) with its own sender identifier in message 304. In another embodiment, message 304 does not include a sender identifier if relay computing system 164 will automatically know the identity of relay computing system 144 upon establishing communication link 108.

In some embodiments, message 304 is a binary message containing data from message 302 included in a binary form. In other embodiments, message 304 includes a header and a message body. The header includes data such as the size of the message, which can be used for error checking to ensure that message 304 was accurately received. The message body includes at least part of the data from message 302.

In some embodiments, message 304 is encrypted for secure communication. Any desired type of encryption can be used, such as public key cryptography, private key cryptography, operating system encryption, password encryption, or encryption conforming to the Web Services Security (WSS) specification developed by committee in the Organization for the Advancement of Structured Information Standards (OASIS). Message 304 can also be compressed if desired for more compact transmission.

Relay computing system 144 generates message 304 and sends it across communication link 108 to relay computing system 164. If message 304 is encrypted and/or compressed, relay computing system 164 decrypts and/or decompresses message 304, such as to convert message 304 into a text format, for example. Relay computing system 164 reads message 304 and determines whether or not a response is desired. For example, relay computing system 164 determines whether message 304 includes a sender identifier. If so, relay computing system 164 determines that a response is desired.

If a response is desired, relay computing system 164 stores at least some of message 304 in memory structure 320. For example, relay computing system 164 stores a message identifier and the sender identifier. This is useful, for example, in embodiments in which there are multiple communication links 108, and more than two relay computing systems. In some of these embodiments, relay computing system 164 would need to determine which of the multiple relay computing systems is the appropriate recipient of the response. The data stored within memory structure 320 enables relay computing system 164 to make that determination. In embodiments having only one communication link 108, it may not be necessary to store data from message 304 in memory structure 320. Rather, in such embodiments, relay computing system 164 can operate to direct all responses to relay computing system 144.

After message 304 has been received by relay computing system 164, relay computing system 164 generates message 306, and posts message 306 to peer network 120. Message 306 includes at least some of message 304. However, in some embodiments, relay computing system 164 replaces the sender identifier of message 304 with its own sender identifier when generating message 306. In this way, members of peer network 120 will direct a response to message 306 to relay computing system 164 rather than to relay computing system 144, which is inaccessible due to boundary 106.

Once message 306 has been posted to peer network 120, message 306 is distributed to the members of peer network 120, including computing system 160 and computing system 162. In the illustrated embodiment, computing system 162 is capable of performing an operation requested by message 306 (and originally requested by message 302). Therefore, computing system 162 receives a message 306 and performs the desired operation. If a response was requested, a response is then delivered to the originating computing system (e.g., computing system 140), which is illustrated and described with reference to FIG. 6.

Figure 4:
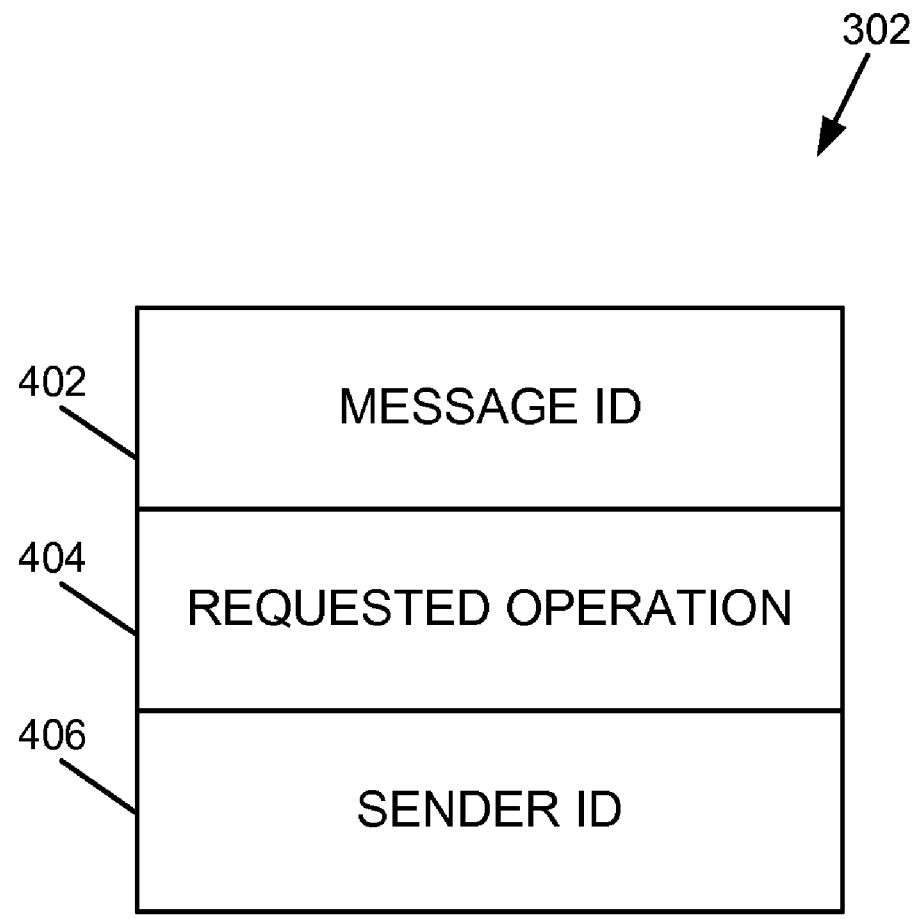
FIG. 4 is a block diagram of an example message communicated in the embodiment of the dynamically extended peer network shown in FIG. 3.

FIG. 4 is a block diagram of an example message 302. In this example, message 302 includes message identifier 402, requested operation 404, and sender identifier 406. Although the message shown in FIG. 4 is referred to as message 302, in some embodiments the message is the same as message 304 (shown in FIG. 3). In some embodiments, the message is the same as message 306 (shown in FIG. 3). However, the message structure illustrated is only one example of a possible message 302, and some embodiments will not include all of message identifier 402, requested operation 404, and sender identifier 406.

Message identifier 402 is a unique identifier of message 302. In some embodiments, message identifier is included in all related messages to provide a consistent identifier that can be used to reference the original message 302. For example, messages 304 and 306 (shown in FIG. 3) include the same message identifier 402 as the original message 302. Subsequent messages that are unrelated to message 302, however, will be given a different message identifier.

In some embodiments, message identifier 402 is a globally unique identifier (GUID) that is assigned by the originating computing system (e.g., computing system 140). Other identifiers could also be used.

In one embodiment, requested operation 404 includes information requesting that a computing system perform an operation. Requested operation 404 can take many forms, including a command, a script, a text-based message, binary code, or a variety of other forms. In any event, requested operation 404 is understood by the receiving computing system as a request to do something. In some embodiments, requested operation 404 is a request that a computing system perform an action relating to a resource. In other embodiments, requested operation 404 requests that some other action be performed, such as to display a message to a user; send a message to another computing system; utilize a device connected to the computing system; modify, save, or delete data in memory or on a data storage device; process data provided in requested operation 404 and return a result; or a wide variety of other actions.

Sender identifier 406 is a unique identifier of the sender of the message 302. In some embodiments, sender identifier 406 acts as a return address to message 302 such that the receiving computing system knows where the message came from. In one embodiment, sender identifier 406 is a network address of computing system 140 (shown in FIG. 3). In another embodiment, sender identifier 406 is a name of computing system 140 (shown in FIG. 3). Other identifiers can also be used in other embodiments. The sender identifier is not included in all messages, such as if no response is required to message 302.

As described herein, messages 304 and 306 also include a sender identifier in some embodiments. In some possible embodiments, however, the sender identifier of messages 304 and 306 do not identify computing system 140, but rather identify the computing system which generated the respective message. For example, the sender identifier of message 304 identifies computing system 144 (shown in FIG. 3). In another example, sender identifier of message 306 identifies relay computing system 164 (shown in FIG. 3).

Figure 5:
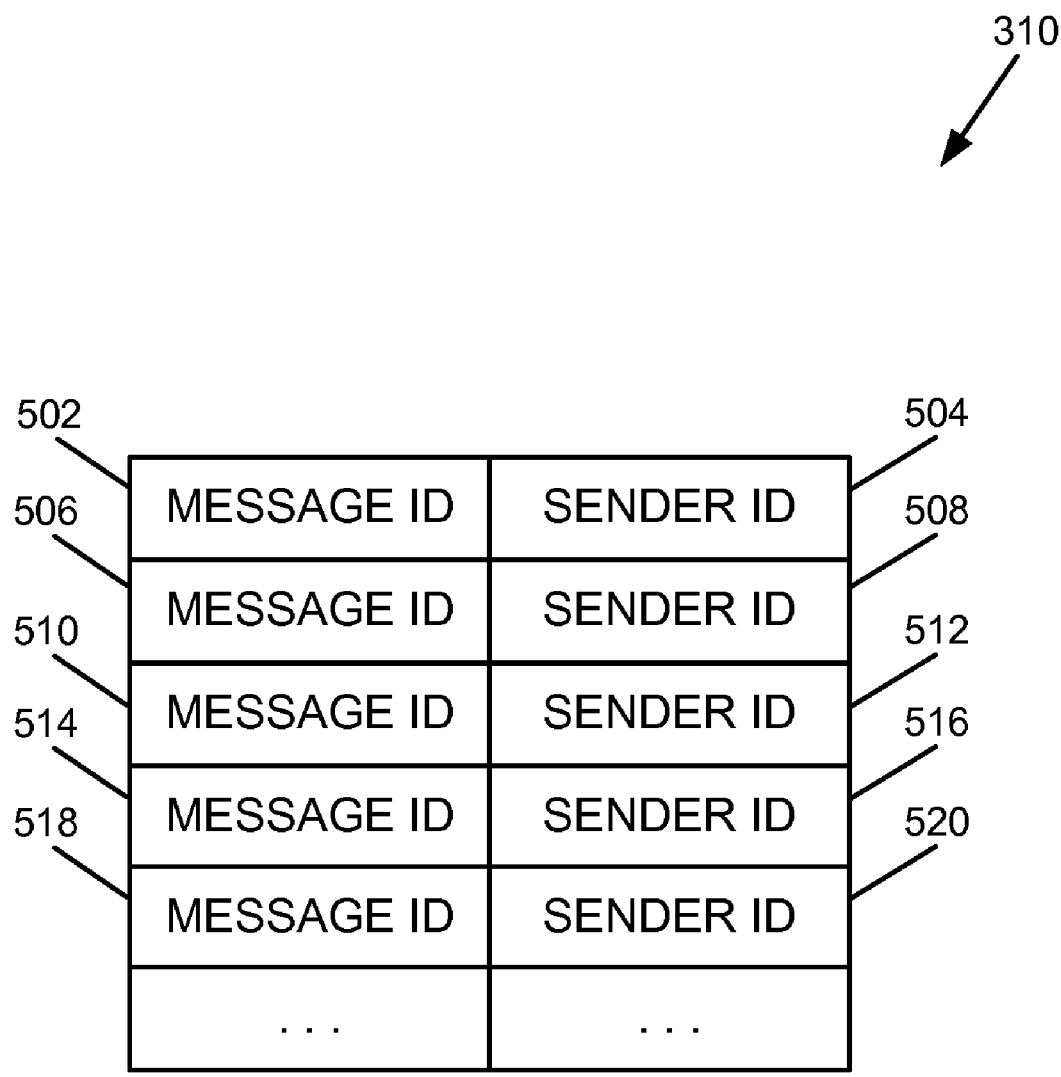
FIG. 5 is a block diagram of an example memory structure of the dynamically extended peer network shown in FIG. 3.

FIG. 5 is a block diagram of an example memory structure 310. As illustrated in FIG. 3, memory structure 310 is capable of being accessed by relay computing system 144. Memory structure 310 is any type of memory or data storage device, such as memory 204, removable storage 208, non-removable storage 210, or a storage device connected to relay computing system 144 by communication connection 212 (all shown in FIG. 2). In the illustrated example, memory structure 310 stores a plurality of message identifiers 502, 506, 510, 514, and 518, and a plurality of sender identifiers 504, 508, 512, 516, and 520, each associated with the respective message identifier.

When message 302 (shown in FIG. 4) is received by relay computing system 144 (shown in FIG. 3), relay computing system 144 reads message 302 and, in some embodiment, stores at least a part of message 302 in memory structure 310. For example, relay computing system 144 reads message ID 402, requested operation 404, and sender ID 406 from message 302. Relay computing system 144 then stores message ID 402 in memory structure 310 as message ID 502. In addition, relay computing system 144 stores sender ID 406 in memory structure 310 as sender ID 504, such that sender ID 504 is associated with message ID 502. When subsequent messages are received by relay computing system 144, the message identifiers and sender identifiers are stored in memory structure 310. For example, relay computing system 144 stores the message ID and sender ID of the next received message as message ID 506 and sender ID 508.

Figure 6:
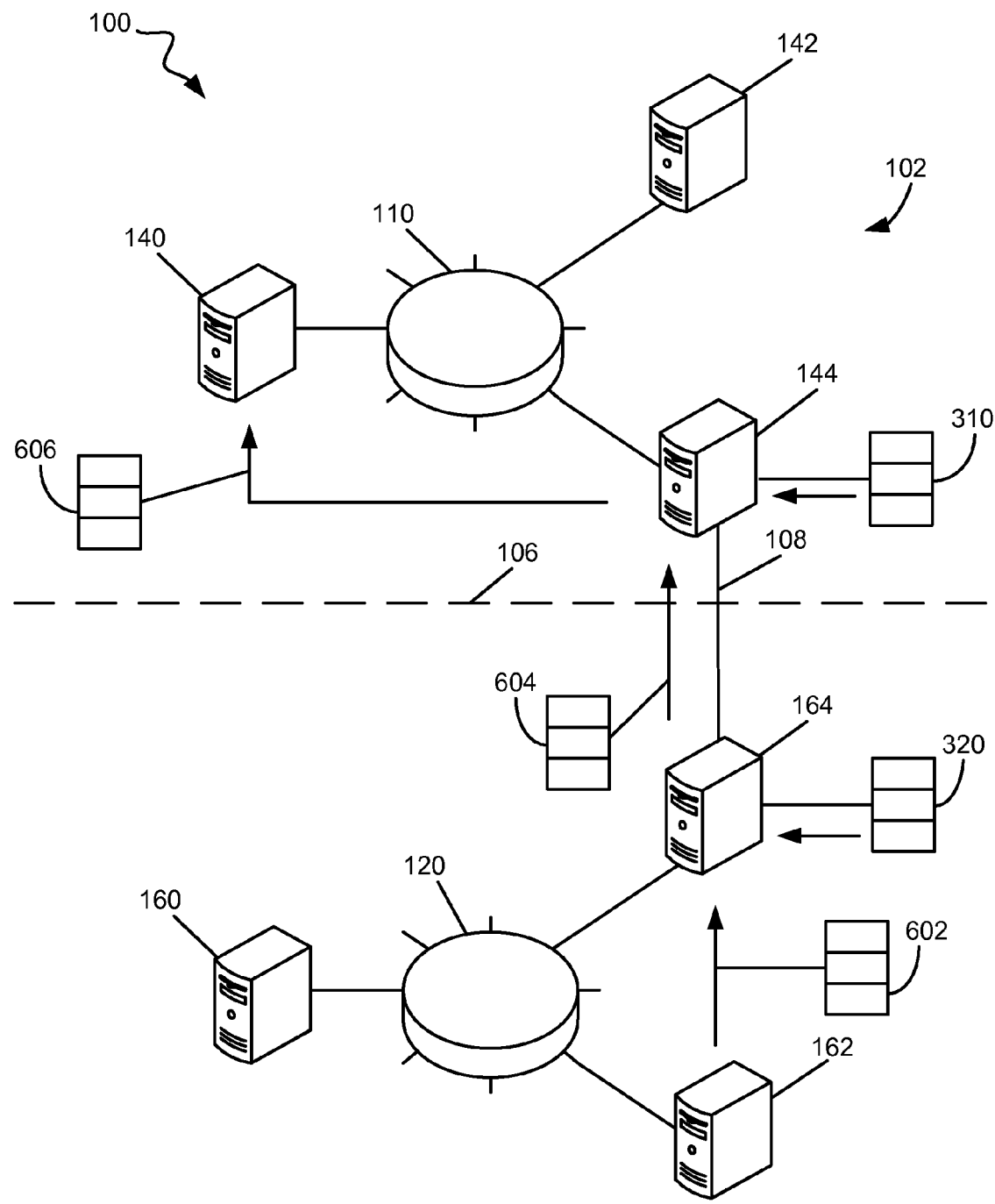
FIG. 6 is a block diagram illustrating an embodiment of the dynamically extended peer network shown in FIG. 1.

FIG. 6 is a block diagram of an extended peer network 100 communicating a response from computing system 162 to computing system 140. The response is, for example, in response to the message sent from computing system 140, as shown and described with reference to FIG. 3. The response is communicated through message 602, message 604, and message 606.

In some embodiments, extended peer network 100 is capable of operating to send the response to a computing system which originally sends a message. In some embodiments, extended peer network 100 provides the response through direct communications, rather than broadcasting the response through peer networks 110 and 120. One of the benefits of using direct communication is that it reduces the number of messages that are broadcast throughout peer networks 110 and 120.

After computing system 162 has finished performing a requested operation, computing system 162 generates message 602. Message 602 is similar to message 306 in some embodiments, except that the sender identifier is not included unless further communication is desired between computing system 140 and computing system 162 relating to the current round of communications. In some embodiments, however, message 602 does include a message identifier and a response.

The message identifier of message 602 identifies the message identifier (e.g., 402) of the original message. The message identifier is used to route the response of message 602 to the appropriate computing system which originated the original message.

Message 602 is communicated from computing system 162 to relay computing system 164. In one embodiment, direct communication is used to communicate message 602, such that message 602 does not need to be broadcast on peer network 120.

Message 602 is received by computing system 162. Relay computing system 164 reads message 602 and extracts the message identifier. Using the message identifier, relay computing system 164 queries memory structure 320 to determine the sender identifier associated with the message identifier (e.g., such as shown in FIG. 5). Memory structure 320 is scanned to locate the matching message identifier (e.g., message ID 502), and the associated sender identifier (e.g., sender ID 504) is returned to relay computing system 164. Relay computing system 164 uses the sender identifier to know where to send message 604. In other embodiments, relay computing system 164 does not query memory structure 320, but rather sends all messages it receives to relay computing system 144.

After message 602 has been received by relay computing system 164, it generates message 604. In some embodiments, message 604 is similar to message 304, shown in FIG. 3. However, in some embodiments, message 604 includes the message identifier from message 602 and the response from message 604, and does not include a sender identifier. In other embodiments, a sender identifier is also included.

Relay computing system 164 establishes a connection with relay computing system 144 over communication link 108, if the connection is not already established, and sends message 604 to relay computing system 144.

Once message 604 is received by relay computing system 144 it reads the message and extracts the message identifier. The message identifier is then used to query memory structure 310 to identify the associated sender identifier. The sender identifier is then used by computing system 144 to send message 606 to computing system 140.

Computing system 144 generates message 606. In one embodiment, message 606 is similar to message 302 (such as shown in FIGS. 3 and 4), except that message 606 includes a response rather than requested operation 404. Also, in some embodiments message 606 does not include a sender identifier. Computing system 144 sends message 606 directly to computing system 140, bypassing peer network 110. In this way, the response is delivered to computing system 140.

Figure 7:
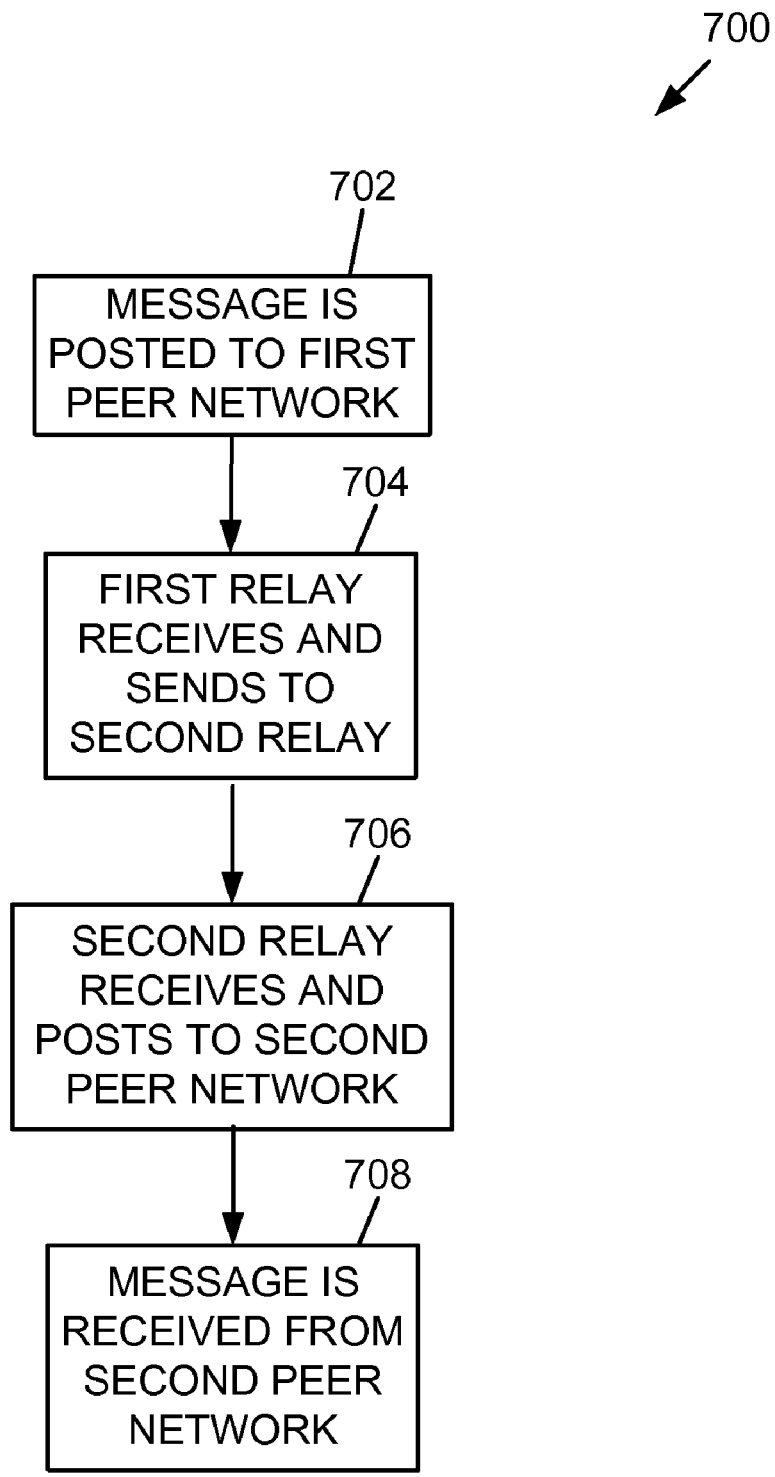
FIG. 7 is a flow chart illustrating a method of communicating between a first peer network and a second peer network separated by a boundary.

FIG. 7 is a flow chart illustrating method 700 of communicating between a first peer network and a second peer network separated by a boundary. Examples of method 700 are illustrated in FIGS. 1 and 3. The method includes operations 702, 704, 706, and 708.

Method 700 begins with operation 702, during which a message is posted to the first peer network. Once the message is posted to the first peer network, the message is distributed to the members of the peer network. An example of the first peer network is peer network 110, shown in FIG. 1.

Operation 704 is next performed, during which a first relay receives the message and then sends it to a second relay. An example of the first relay is relay computing system 144 shown in FIG. 1. An example of the second relay is relay computing system 164 shown in FIG. 1. Operation 704 is illustrated and described in more detail with reference to FIG. 8.

Following operation 704, operation 706 is performed, during which the second relay receives the message and post the message to a second peer network. An example of the second peer network is peer network 120 shown in FIG. 1. Operation 706 is illustrated and described in more detail with reference to FIG. 9.

Following operation 706, operation 708 is performed, during which the message is received from the second peer network. For example, a computing system that is a member of the second peer network receives the message. Following operation 706, the computing system that receives the message can perform an operation identified in the message. Furthermore, the computing system can also send the response, such as illustrated and described with reference to FIGS. 10-12.

Figure 8:
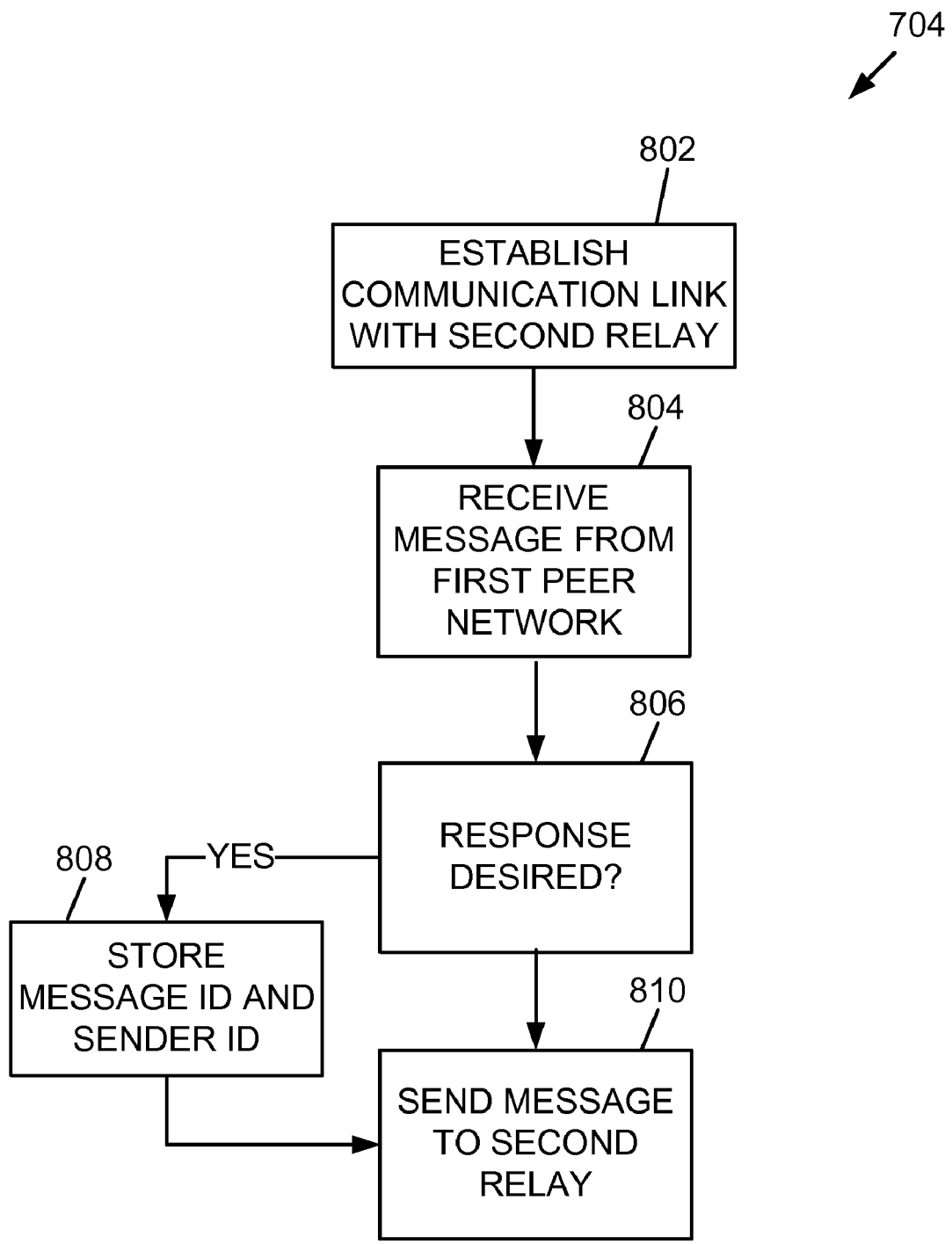
FIG. 8 is a flow chart illustrating an example operation of the method shown in FIG. 7.

FIG. 8 is a flow chart illustrating an example of operation 704. Operation 704 includes operations 802, 804, 806, 808, and 810. In one embodiment, operation 704 is performed by relay computing system 144, shown in FIG. 1.

Operation 704 begins with operation 802, during which a communication link is established between a first relay computing system and a second relay computing system. In one embodiment, the communication link is communication link 108 shown in FIG. 1. In this example of operation 704, operation 802 is shown as occurring before operations 804, 806, and 808. However, in other embodiments operation 802 is performed after operation 804, operation 806, or operation 808. In other embodiments, the communication link is always active, such that operation 802 does not have to be separately performed in operation 704 to establish the communication link.

Operation 804 is next performed, during which a message is received from the first peer network. In one embodiment, the message is received as a result of a message being posted to the first peer network. The first relay computing system is a member of the first peer network, and therefore, the first relay computing system automatically receives a copy of the message posted to the first peer network.

Following operation 804, operation 806 is performed to determine whether a response to the message is desired. If a response is desired, operation 808 is performed. If a response is not desired, operation 810 is performed.

In one embodiment of operation 806, the determination of whether a response to the message is desired is determined by evaluating the message received. If the message contains an indication that a response is desired, such as by including a return address, then operation 806 determines that a response is desired. However, if no such indication is present in the message, then operation 806 determines that a response is not desired. Alternatively, particular codes, flags, bits, or other indicators can be included within a message to identify whether or not a response is desired. In other embodiments, operation 806 is not performed within operation 704, and instead operation 808 is performed following operation 804. In another possible embodiment, operations 806 and 808 are performed after operation 810.

If operation 806 determines that a response is desired, operation 808 is then performed. During operation 808, a message identifier and a sender identifier are extracted from the message received and stored. For example, operation 808 stores the message identifier and the sender identifier in a memory structure, such as shown in FIG. 5.

Operation 810 is then performed, during which the message is sent to the second relay computing system. For example, the message is sent across communication link 108. In some embodiments, operation 810 enables the message to be sent across a boundary, such as boundary 106, shown in FIG. 1.

Figure 9:
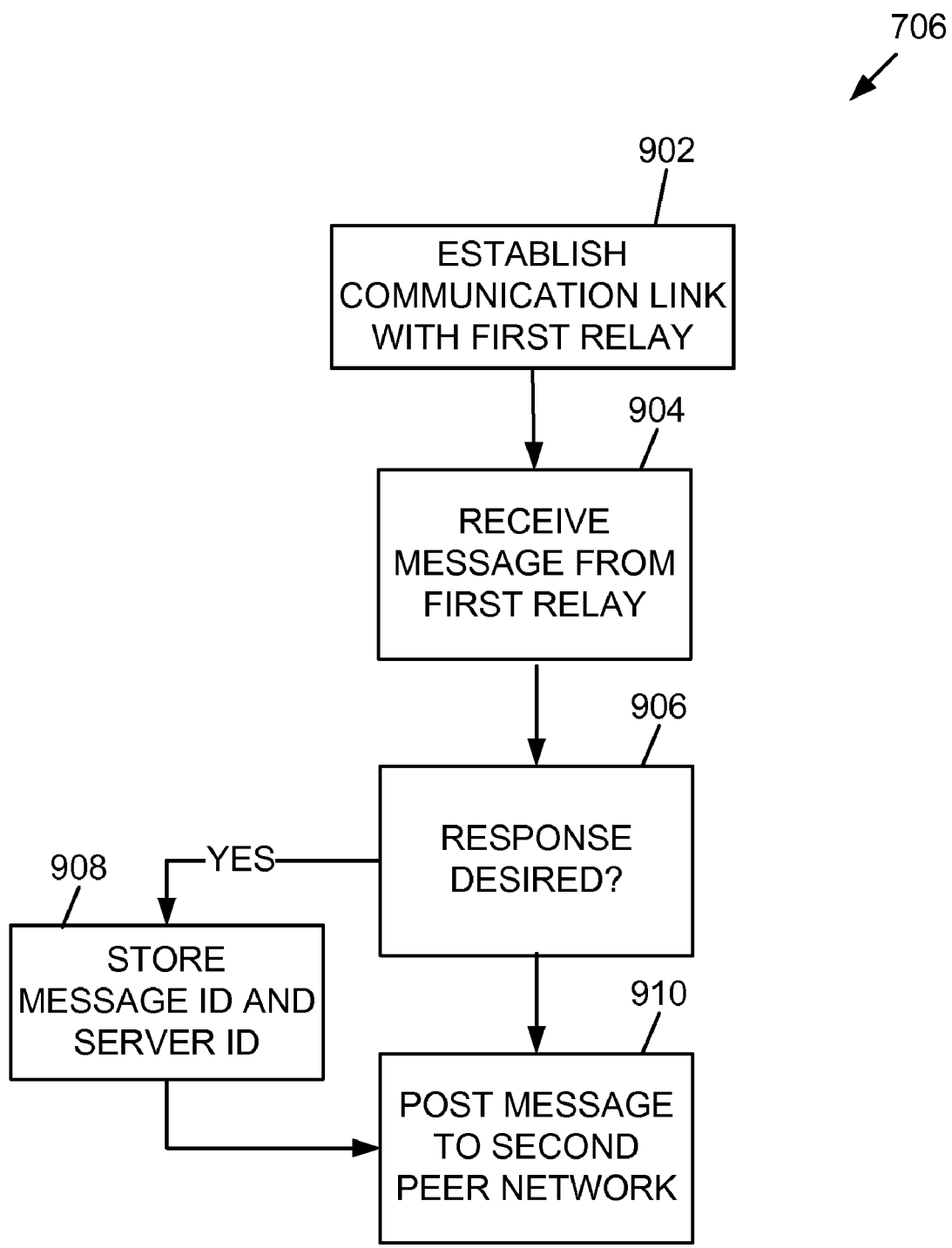
FIG. 9 is a flow chart illustrating an example operation of the method shown in FIG. 7.

FIG. 9 is a flow chart illustrating an example of operation 706. Operation 706 includes operation 902, operation 904, operation 906, operation 908, and operation 910. In one embodiment, operation 706 is performed by relay computing system 164, shown in FIG. 1.

Operation 706 begins with operation 902, during which the communication link is established between a first relay computing system and a second relay computing system. In one embodiment, the communication link is communication link 108 shown in FIG. 1. In this example of operation 706, operation 902 is shown as occurring before operations 904, 906, 908, and 910. However, in other embodiments operation 902 is performed after operation 904, operation 906, or operation 908. In other embodiments, the communication link is always active, such that operation 902 does not have to be separately performed in operation 706 to establish the communication link.

Following operation 902, operation 904 is performed, during which a message is received from the first relay computing system. In one embodiment, the message is received through direct connection with the first relay computing system. In one embodiment, the message is as shown in FIG. 4, and contains the message identifier, a requested operation, and a sender identifier.

Following operation 904, operation 906 is performed to determine whether a response to the message is desired. If a response is desired, operation 908 is performed. If a response is not desired, operation 910 is performed.

In one embodiment of operation 906, the determination of whether a response to the message is desired is determined by evaluating the message received. If the message contains an indication that a response is desired, such as by including a return address, then operation 906 determines that a response is desired. However, if no such indication is present in the message, then operation 906 determines that a response is not desired. Alternatively, particular codes, flags, bits, or other indicators can be included within a message to identify whether or not a response is desired. In other embodiments, operation 906 is not performed within operation 706, and instead operation 908 is performed following operation 904. In another possible embodiment, operations 906 and 908 are performed after operation 910.

If operation 906 determines that a response is desired, operation 908 is then performed. During operation 908, a message identifier and a sender identifier are extracted from the message received and stored. For example, operation 908 stores the message identifier and the sender identifier in a memory structure, such as shown in FIG. 5.

Operation 910 is then performed, during which the message is posted to the second peer network. The message is then received by a member of the second peer network in operation 708, shown in FIG. 7.

Figure 10:
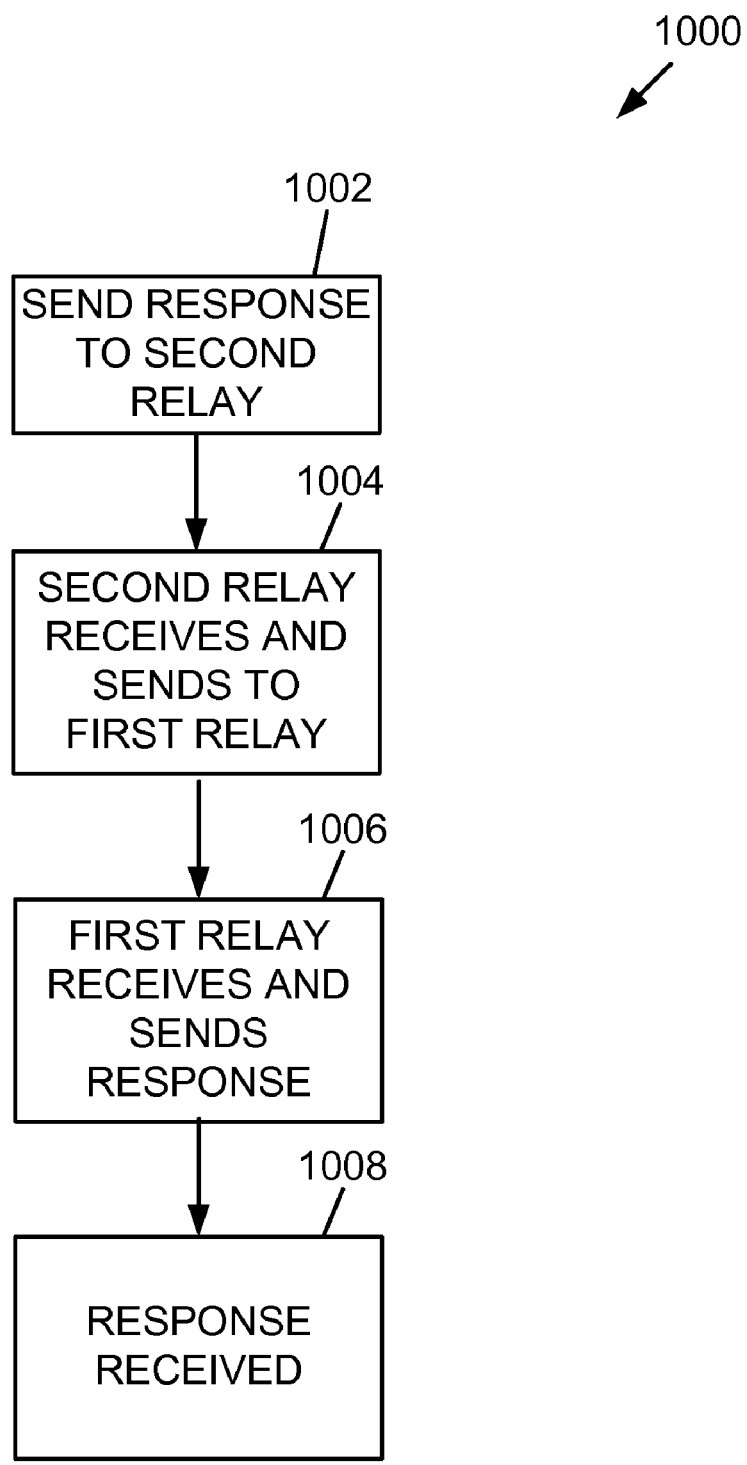
FIG. 10 is a flow chart illustrating an example method for communicating a response to the message shown in FIG. 3.

FIG. 10 is a flow chart illustrating an example method 1000 for communicating a response to a message. An example of method 1000 is illustrated in FIG. 6. Method 1000 includes operation 1002, operation 1004, operation 1006, and operation 1008.

Method 1000 begins with operation 1002, during which a response is sent to the second relay computing system. In one embodiment, the second relay computing system is relay computing system 164, shown in FIG. 1. In this way, the response is not broadcast on the second peer network (e.g., peer network 120, shown in FIG. 1). This is beneficial, for example, to reduce network traffic. In an alternate embodiment, however, operation 1002 posts the response to the second peer network which delivers the message to the second relay computing system.

Operation 1004 is next performed, during which the second relay computing system receives the response, and sends the response to the first relay computing system. An example of the first relay computing system is relay computing system 144, shown in FIG. 1. Operation 1004 is illustrated and described in more detail with reference to FIG. 11.

Following operation 1004, operation 1006 is performed, during which the first relay computing system receives the response and sends the response to the intended recipient. Operation 1006 is illustrated and described in more detail with reference to FIG. 12.

Operation 1008 is next performed, during which the response is received by the intended recipient. The intended recipient is a computing system which originally sent the message that prompted the response.

Figure 11:
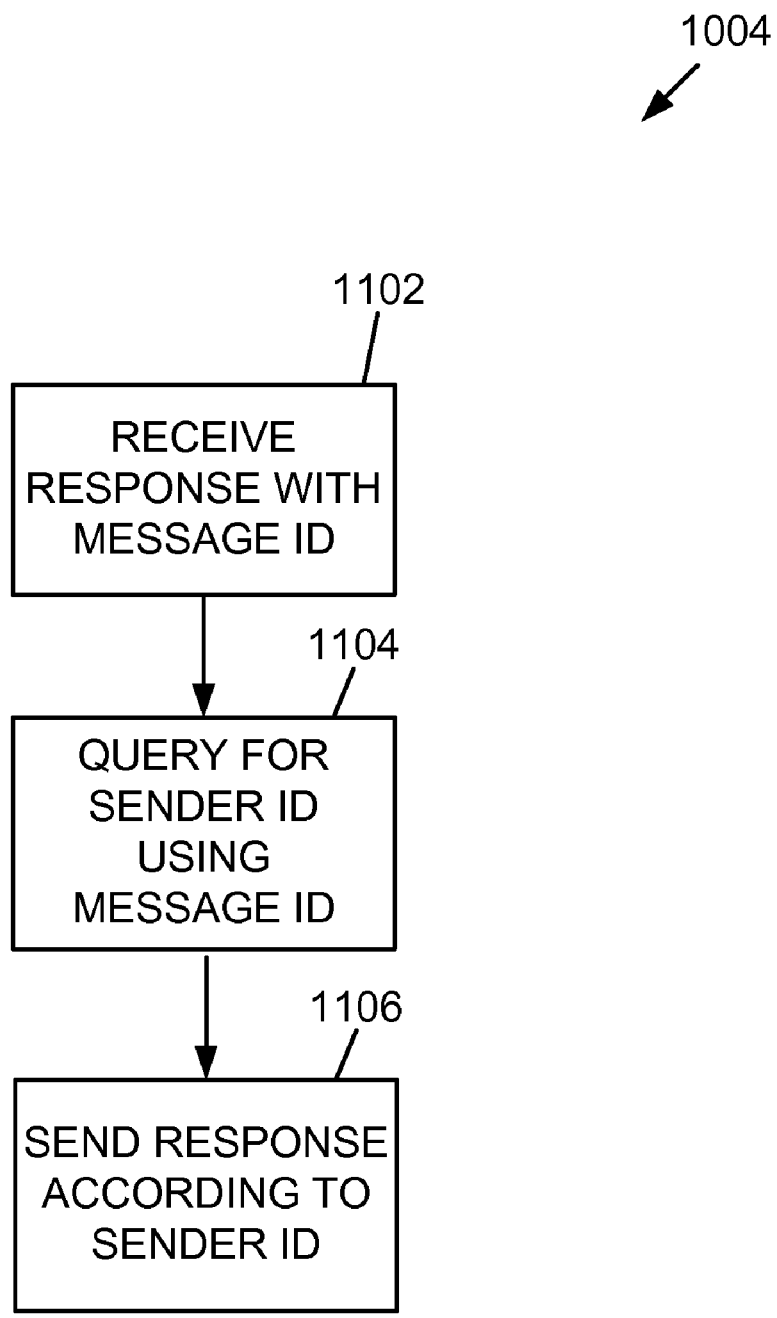
FIG. 11 is a flow chart illustrating an example operation of the method shown in FIG. 10.

FIG. 11 is a flow chart illustrating an example of operation 1004. In one embodiment, operation 1004 is performed by the second relay computing system, such as relay computing system 164, shown in FIG. 1. Operation 1004 includes operations 1102, 1104, and 1106.

Operation 1004 begins with operation 1102, during which the response is received by the second relay computing system. The response includes a message identifier that identifies the original message that prompted the response. The second relay computing system extracts the message identifier from the response.

Next, operation 1104 is performed, during which the second relay computing system queries a memory structure for a sender identifier using the message identifier. An example of the memory structure is shown in FIG. 5. The sender identifier is stored within the memory structure such that it is associated with a message identifier. As a result, the second relay computing system can use the message identifier to lookup the sender identifier associated with the message identifier. The sender identifier informs the second relay computing system of the identity of the computing system to which the response should be directed.

Accordingly, operation 1106 is performed, during which the response is sent according to the sender identifier. In other words, the response is sent to the computing system identified by the sender identifier. As one example, the sender identifier identifies the first relay computing system (e.g., relay computing system 144), and as a result the response is sent to the first relay computing system.

Figure 12:
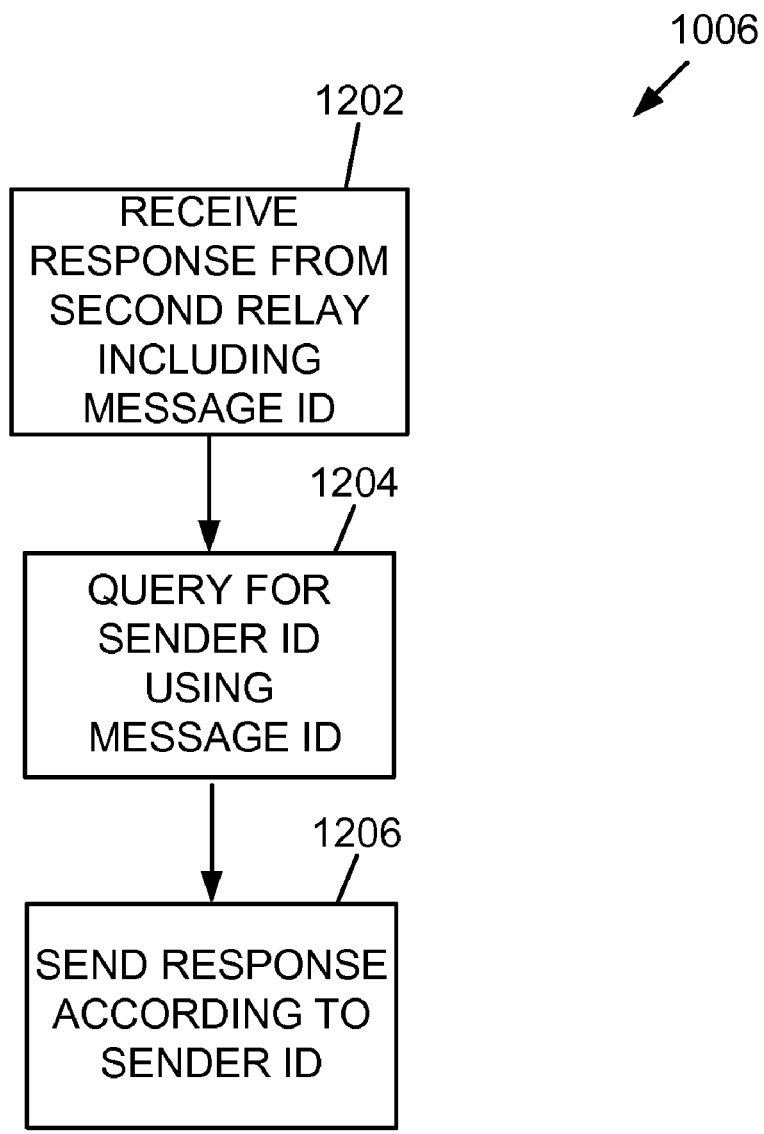
FIG. 12 is a flow chart illustrating an example operation of the method shown in FIG. 10.

FIG. 12 is a flow chart illustrating an example of operation 1006. In one embodiment, operation 1006 is performed by the first relay computing system, such as relay computing system 144, shown in FIG. 1. Operation 1006 includes operations 1202, 1204, and 1206.

Operation 1006 begins with operation 1202, during which the response is received from the second relay computing system by the first relay computing system. The response includes a message identifier that identifies the original message that prompted the response. The first relay computing system extracts the message identifier from the response.

Operation 1204 is then performed, during which the first relay computing system queries a memory structure for a sender identifier using the message identifier. An example of a memory structure is shown in FIG. 5. The sender identifier is stored within the memory structure such that is associated with a message identifier. As a result, the first relay computing system can use the message identifier to lookup the sender identifier associated with the message identifier. The sender identifier informs the first relay computing system of the identity of the computing system to which the response should be directed.

Accordingly, operation 1206 is performed, during which the response is sent according to the sender identifier. In other words, the response is sent to the computing system identified by the sender identifier. As one example, the sender identifier identifies the computing system that originally sent to the message that prompted the response (e.g., computing system 140, shown in FIG. 1). Therefore, the response is delivered to the appropriate computing system. Operation 1008 is then performed, during which the response is received by the computing system, such as shown in FIG. 10.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of communicating between a first peer network including a first computing system and a second peer network having a second computing system, the first peer network and the second peer network separated by a boundary, the method comprising:

establishing a communication link between the first computing system of the first peer network and the second computing system of the second peer network, the communication link capable of communicating through the boundary;

receiving a first message from the first peer network with the first computing system, the first message including a request to perform an operation executable by at least one resource of the second peer network, wherein the at least one resource of the second peer network is absent from the first peer network, and wherein the first message further comprises a message identifier and a sender identifier, the message identifier uniquely identifying the first message, and the sender identifier uniquely identifying an originating computing system on the first peer network;

storing the message identifier and the sender identifier in a memory structure;

sending a second message including the request to perform an operation and the message identifier to the second computing system at the second peer network to deliver the request to perform an operation to the second peer network;

receiving a response from the second computing system, the response including the message identifier;

querying the memory structure with the first computing system to retrieve the sender identifier associated with the message identifier;

establish a second communication link to the originating computing system; and sending the response to the originating computing system identified by the sender identifier.

2. The method of claim 1, wherein the first message does not identify an intended recipient.

3. The method of claim 1, further comprising:

receiving the request to perform an operation from the second peer network with a third computing system; and performing the operation identified by the request to perform an operation with the third computing system.

4. The method of claim 1, further comprising performing a filter operation according to a rule before sending the first message to determine whether the first message should be sent to the second computing system.

5. A computer readable medium containing computer executable instructions which when executed by a computer perform a method of communicating between a first peer network and a second peer network separated by a boundary, the method comprising:

establishing a communication link between the first computing system of the first peer network and the second computing system of the second peer network, the communication link capable of communicating through the boundary;

receiving a first message from the first computing system, the first message including a request to perform an operation executable by at least one resource of the second peer network, wherein the at least one resource of the second peer network is absent from the first peer network, and wherein the first message further comprises a message identifier identifying an original message:

storing the message identifier and a sender identifier in a memory structure, the sender identifier uniquely identifying the first computing system;

posting a second message to the second peer network, the second message including the request to perform the operation;

receiving with the second computing device a response, the response including the message identifier;

querying the memory structure, using the message identifier, to retrieve the sender identifier from the memory structure;

establish a second communication link to the originating computing system; and sending the response from the second computing system to the first computing system for delivery to an originating computing system of the original message.

6. The computer readable medium of claim 5, the method further comprising:

receiving the second message from the second peer network with a third computing system; and performing the operation identified by the request to perform the operation from the second message.

7. The computer readable medium of claim 5, wherein receiving with the second computing device a third message from a computing system on the second peer network further comprises:

establishing a second communication link between a third computing system on the second peer network and the second computing system identified in the second message; and sending a response to the second computing system through the second communication link.

8. A system for communicating messages from a first peer network to a second peer network across a communication link, the second peer network including a second computing system, the first peer network and the second peer network separated by a boundary, the system comprising:

a communication system configured to receive messages from the first peer network and to send messages across the communication link to the second computing system;

memory storing program instructions; and a processor in data communication with the communication system and the memory, wherein the processor is configured to execute the program instructions to cause the system to:

communicate with the second computing system to establish the communication link between the communication system and the second computing system of the second peer network, the communication link capable of communicating through the boundary, wherein the boundary comprises at least one of a firewall, a company boundary, a software boundary, a physical boundary, and a domain boundary, the communication link being a secure and direct communication link;

receive a first message from the first peer network with the communication system, the first message including a first request to perform an operation executable by at least one resource of the second peer network, wherein the at least one resource of the second peer network is absent from the first peer network, a first message identifier identifying the first message, and a sender identifier uniquely identifying an originating computing system within the first peer network from which the first message originated;

store in a memory structure readable by the processor, the first message identifier and the sender identifier in extensible markup language;

send a second message with the communication system to the second computing system to deliver the first request to perform the operation to the second peer network;

receive a response from the second computing system, the response including the first message identifier;

query the memory structure using the message identifier to retrieve the sender identifier associated with the first message identifier;

establish a second communication link to the originating computing system; and send the response to an originating computing system of the first peer network identified by the sender identifier.

* * * * *